(12) United States Patent
Junkers

(10) Patent No.: US 6,883,401 B2
(45) Date of Patent: Apr. 26, 2005

(54) POWER TOOL FOR FASTENING OBJECTS

(76) Inventor: John K. Junkers, 8 Stonewall Rd., Saddle River, NJ (US) 07458

(*) Notice: Subject to any disclaimer, the term of this patent is extended or adjusted under 35 U.S.C. 154(b) by 0 days.

(21) Appl. No.: 10/120,343

(22) Filed: Apr. 11, 2002

(65) Prior Publication Data

US 2003/0106396 A1 Jun. 12, 2003

Related U.S. Application Data

(63) Continuation-in-part of application No. 10/010,377, filed on Dec. 6, 2001, now Pat. No. 6,609,868.

(51) Int. Cl.[7] .................. B46B 13/46; F16B 29/00; F16B 43/00
(52) U.S. Cl. ............... 81/57.39; 411/917; 411/534; 411/263; 411/204; 411/209
(58) Field of Search .................. 81/55, 56, 57.38, 81/57.39; 411/14.5, 916, 917, 397, 432–434, 531–534, 990, 263, 204, 209, 349, 292, 222–223

(56) References Cited

U.S. PATENT DOCUMENTS

| | | | |
|---|---|---|---|
| 1,678,404 A | | 7/1928 | Moore et al. |
| 1,678,409 A | | 7/1928 | Ward |
| 3,627,334 A | | 12/1971 | Reddy |
| 3,633,446 A | | 1/1972 | Kawasaki |
| 3,701,372 A | * | 10/1972 | Breed .................. 411/309 |
| 4,191,389 A | | 3/1980 | Jelinek |
| 4,362,449 A | * | 12/1982 | Hlinsky .................. 411/156 |
| 4,702,657 A | | 10/1987 | Jelinek |
| 4,887,948 A | | 12/1989 | Calmettes |
| 4,892,000 A | | 1/1990 | Renk et al. |
| 4,983,084 A | * | 1/1991 | Gray .................. 411/311 |
| 5,341,560 A | | 8/1994 | Junkers |
| 5,538,379 A | | 7/1996 | Junkers |
| 5,539,970 A | * | 7/1996 | Junkers .................. 29/446 |
| 5,640,749 A | * | 6/1997 | Junkers .................. 29/446 |
| 5,779,413 A | * | 7/1998 | Cosenza .................. 411/302 |
| 5,946,789 A | | 9/1999 | Junkers |
| 6,254,323 B1 | | 7/2001 | Junkers |
| 2001/0039858 A1 | | 11/2001 | Junkers |

FOREIGN PATENT DOCUMENTS

| | | |
|---|---|---|
| DE | 24 18 598 A | 10/1975 |
| EP | 0 708 259 A | 4/1996 |
| EP | 1 080 847 A | 3/2001 |
| FR | 693 392 | 1/1930 |
| FR | 38 199 E | 4/1931 |
| GB | 1 330 320 A | 9/1973 |
| TW | 350990 | 1/1999 |

* cited by examiner

*Primary Examiner*—Debra S. Meislin
(74) *Attorney, Agent, or Firm*—Michael J. Striker

(57) ABSTRACT

A power tool for fastening objects has a housing with a non-rotatable element, a power drive in the housing and provided with a rotatable driving element, and a fastener part including a bolt having a thread and an axis and introducable into parts forming an object, a nut screwable on the bolt and cooperating with the rotatable driving element, and a washer to be applied between the nut and an object and cooperating with the non-rotatable element, the washer having an axis and being provided with a first bearing face surface located at one axial side and adapted to cooperate with the nut, a second bearing face surface located at an opposite axial side and adapted to cooperate with the object, and at least one third turning resistant surface adapted to cooperate with the thread of the bolt, so that when driving element turns the nut with a given active force in one direction and the washer is held stationarily applied by the non-rotatable element of the housing, the nut turns to tighten or loosen the bolt, and the washer remains rotation stationary while the bolt elongates or relaxes in an axial direction.

18 Claims, 7 Drawing Sheets

POWER TOOL FOR FASTENING OBJECTS

CROSS-REFERENCE TO A RELATED APPLICATION

This application is a continuation-in-part of application Ser. No. 10/010,377 filed on Dec. 6, 2001 now U.S. Pat. No. 6,609,868.

BACKGROUND OF THE INVENTION

The present invention relates to a tool for fastening objects.

It is known to fasten objects with one another with power tools which use fasteners having a multi-part replacement nut, for example including an inner sleeve, an outer sleeve, and a washer. Such a replacement nut is disclosed for example in our U.S. Pat. No. 5,341,560. Another replacement nut is disclosed in our U.S. Pat. No. 6,254,323 in which a bolt has a spline underneath its upper thread, to which a washer is non-rotatably connected, and the bolt also has engaging means for applying a reaction force, while an active force of the same tool turns the nut on the bolt thread and the washer face. In the fastener disclosed in both above mentioned patents, the common features are the use of the action and reaction force of one tool, the elimination of reaction arms on power tools, the conversion of torque to torsion-free bolt stretching and obtaining for the first time the desired residual bolt load rather than a torque, which is estimated based on calculated frictions rather than on actual frictions or a tension, which is based on estimated bolt relaxation when the force is transmitted from the elongated bolt to the hand-tight nut.

The problem found in the industry with the powertool using the fastener disclosed in U.S. Pat. No. 5,341,560 is that, since the nut has to be made with two sleeves whose outside diameter has to meet the outside diameter of a regular nut, both sleeves have less material than a regular nut. This requires the use of high strength materials, which causes a reluctance on the part of the customers to change materials and fear of the unknown. In the fastener disclosed in U.S. Pat. No. 6,254,323 the bolt needs to be altered, which is not just costly but not easily acceptable by the industry. In other words the fastener disclosed in our U.S. Pat. No. 5,341,560 requires alteration of the nut, while the fastener disclosed in our U.S. Pat. No. 6,254,323 requires alteration of the bolt. In addition, both versions are expensive to produce, adding to customer's reluctance to purchase these fasteners.

SUMMARY OF THE INVENTION

Accordingly, it is an object of the present invention to provide a powertool for fastening objects, and a method of fastening with the use of the washer, which avoid the disadvantages of the prior art.

In keeping with these objects, one feature of the present invention resides, briefly stated, in a power tool for fastening objects, comprising a housing provided with a non-rotatable element; a power drive in said housing and provided with a rotatable driving element; and a fastener part including a bolt having a thread and an axis and introducable into at least two parts forming an object, a nut screwable on said bolt and cooperating with said rotatable driving element, and a washer to be applied between said nut and an object and cooperating with said non-rotatable element, said washer having an axis and being provided with a first bearing face surface located at one axial side and adapted to cooperate with said nut, a second bearing face surface located at an opposite axial side and adapted to cooperate with said object, and at least one third turning resistant surface adapted to cooperate with said thread of said bolt, so that when the driving element turns said nut with a given action force in one direction and said washer is held stationarily by a reactive force applied by said non-rotatable element of said housing, only said nut turns to tighten or loosen said bolt, and said washer remains rotation stationary while said bolt elongates or relaxes in an axial direction.

The drag friction created by the nut on the bolt can be quite high. It is the object of the present invention to use a power tool's reaction force in a way that allows the bolt to move in an axial direction when the nut is turned. Therefore, to stop the bolt from turning with or in the third turning resistant surface of the washer when the drag friction is high, a wedge can be inserted between the inner surface of the outer washer part and the outer surface of the inner washer part to increase the turning friction created by the turning resistant surface of the washer with the bolt.

When the power tool is designed in accordance with the present invention, regular nuts and regular bolts can be used. In other words the customer can use whatever he has adding merely a washer. The benefit is quite remarkable. First of all the product is much less expensive than each of the products in the above mentioned patents. Secondly, the customer uses his approved bolts and nuts. Third, instead of reacting on a part of the nut directly as in the U.S. Pat. No. 5,341,560 or indirectly as in the U.S. Pat. No. 5,946,789 by passing the reaction force through the washer to a part of the nut, the reaction force is solely absorbed by the washer. Furthermore, the solution proposed in the present application provides the identical benefits as the solutions disclosed in the above mentioned patents, one of which is a torsion-free elongation of the free portion of the bolt, a known coefficient of friction and thus a known bolt load, a reaction-arm free hydraulic torque tool use, a bridge- and puller-free bolt stretching. In other words, torque is converted into torsion- and side-load-free bolt elongation to the desired bolt load by means of a powertool, which can be also applied to torque regular nuts with a reaction member. It needs to be considered that most bolts in the industry are through bolts with a nut on the other side or blind bolts threaded into the bottom part of the two parts.

It is known that if a power tool is applied to a fastener in a way where the nut is turned by the active force of the power tool and the reaction is absorbed by a regular washer underneath the nut, then either the nut or the washer will turn at will or the bolt turns along with the nut and nothing is accomplished, or the bolt end tightens further into the blind hole causing the bottom threads to mushroom which makes this disassembly extremely difficult. The reason for that is that the nut has two friction areas, the threaded connection with the bolt which creates a drag friction and the facial area with the washer, whereby the washer has one facial area with the nut and one facial area with the two parts to be assembled. In other words, both have two friction areas. While it is correct that a threaded friction is a little less than a facial friction, the difference is minute as the facial friction between the washer and the nut balance each other out, so that there is merely one minute difference between the nut and the washer. At the same time if the bolt is a through bolt, the thread friction between the bolt and the nut is such that the bolt turning resistance is much less than the facial friction of the washer and while the washer would absorb the reaction force without turning, the bolt would turn along with the nut and nothing is accomplished unless a back-up wrench is used to stop the bottom nut from turning. Therefore, neither is enough to guarantee that only the nut turns, which is why the third friction area had to be introduced to the washer. This however not enough to guarantee that only the nut turns.

On the other hand, if the washer is accordance with the thread of the bolt, the bolt can not turn along with the nut because the washer will have to lift up which it can not because the nut is on top of it. Bolt elongation resulting from turning down the nut is, therefore, impossible. The present invention therefore provides a power tool for fastening objects with a bolt thread engaging washer section which is connected with the bolt thread. This alone would not help because this section could move either along with the bolt by rotating or upward if the bolt rotates in it and nothing is accomplished. This in turn would allow the bolt to turn along with the nut as the section rotates or moves up. Therefore in accordance with a further new feature of the present invention, the bolt thread engaging means is frictionally connected with the body of the washer, so that its rotational or upward movement is subject to overcoming a friction greater than a drag friction created on the bolt by the turning nut, to stop the bolt from turning. This friction in conjunction with the two facial frictions of the washer assure that the bolt does not move along with the nut, that the bolt is stretched, and that the washer and its bolt thread engaging section do not rotate while the nut is being turned.

If the reaction force of the tool is applied to the outside of the washer through engagement means thereon, it is also possible to have a pin or the like connected with one end of the thread engagement section and having its other end sticking out of the circumference of the washer so that when the tool is connected with the washer the pin is pushed inwardly pushing the thread engagement section inwardly into the bolt thread.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1' is a view schematically showing the power tool for fastening objects with the tool part and the fastener part in accordance with the present invention;

DESCRIPTION OF THE PREFERRED EMBODIMENTS

Figure 1:
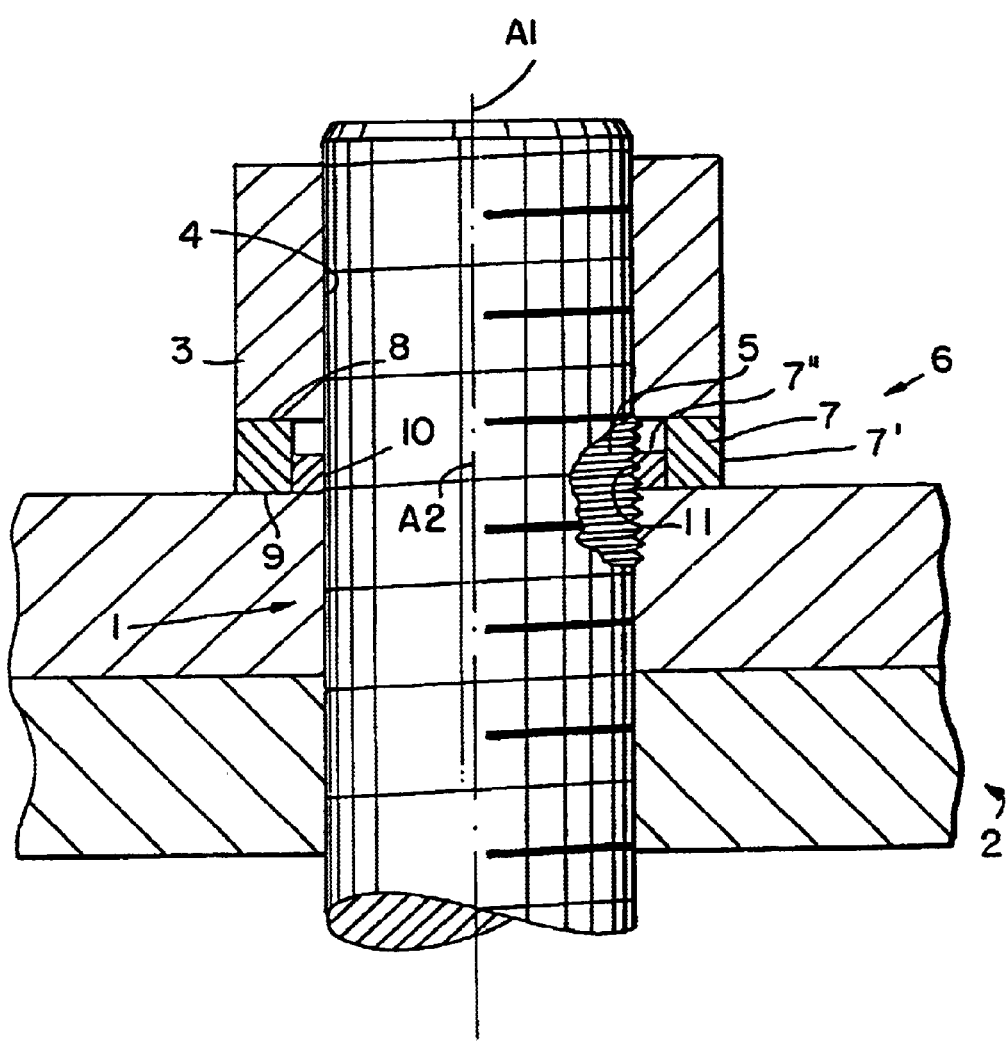
FIG. 1 is a view showing a threaded fastener part to be fastened by a tool of a power tool in accordance with the present invention.
Figure 1:
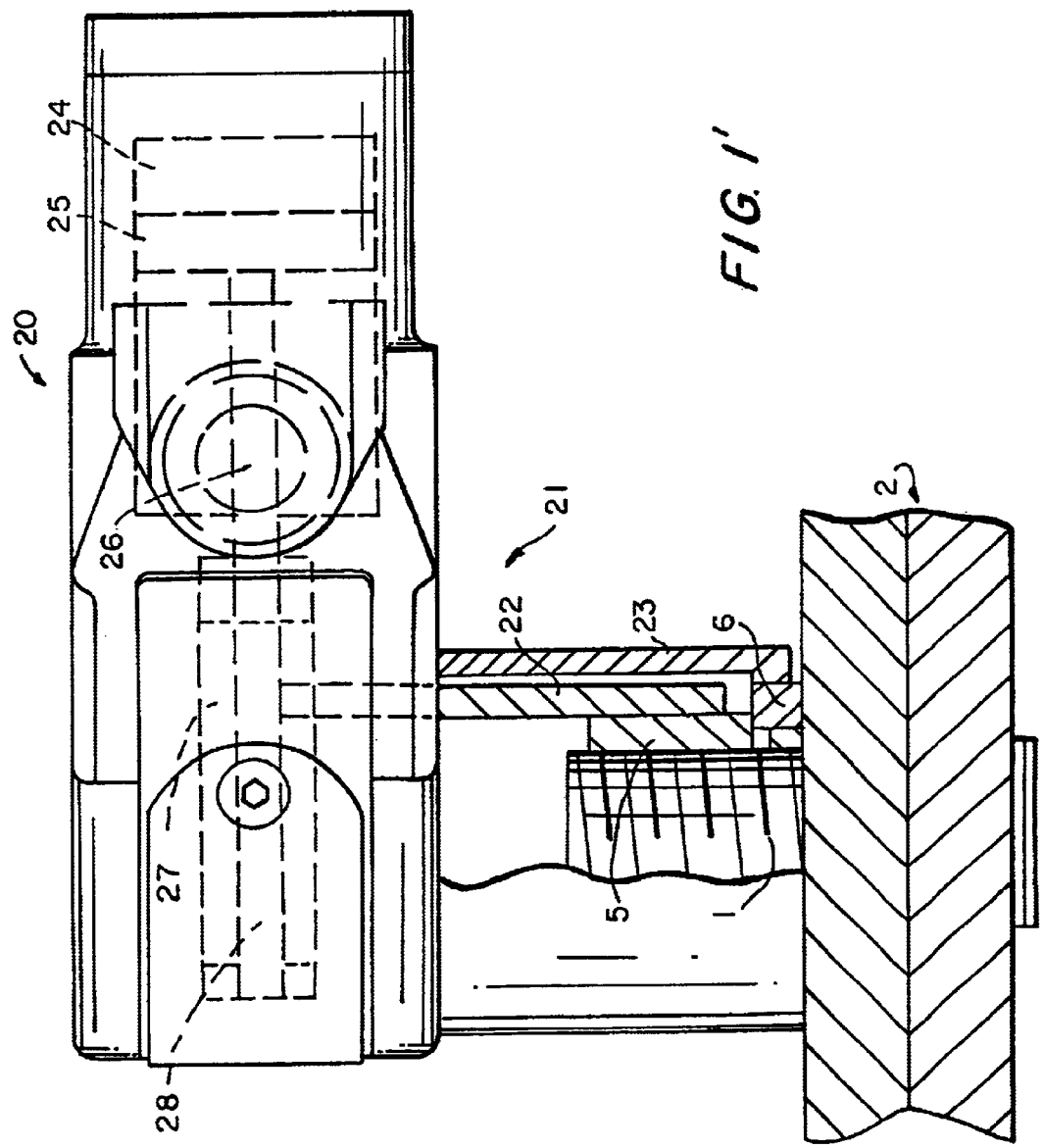

FIG. 1' shows a power tool in accordance with the present invention. The powertool can be an electrically driven, pneumatically driven, hydraulically driven, or manually driven power tool. It has a power tool part with a housing identified as a whole with reference numeral 20, and a power drive in the housing and identified with reference numeral 21. The power tool part further has a rotatable driving element 22 which is to be connected to a nut of a fastener and turn the nut to overcome a thread friction with a bolt and a facial friction with a washer to turn the nut, and a non-rotatable element 23 connectable to a washer to absorb the reaction force due to the facial friction of the washer with the nut, its facial friction with one side of two parts to be fastened with one another, and its turning friction with the bolt, so that the washer and the bolt do not turn but absorb the reaction force of the power tool.

The power drive of the power tool part can include a cylinder 24, a piston 25 reciprocatingly movable in the cylinder under the action of a working fluid medium, a piston rod 26 extending outwardly beyond the cylinder 24 and pivotably connected with at least one driving plate 27 which carries a not shown pawl engaged with a ratchet 28 so as to form a pawl-ratchet mechanism, with the ratchet being turnable and connected with the rotatable driving element 22, while the non-rotatable element 23 is fixedly connected with the housing.

The power tool in accordance with the present invention further has a fastener part with a threaded fastener which has a bolt identified with reference numeral 1 and introducible into an object, which is composed for example of two parts to be assembled with one another as identified with reference numeral 2. The fastener further has a nut which is identified with reference numeral 3. The nut is provided with an inner thread 4 which is screwed on an outer thread 5 of the bolt 1.

The threaded fastener further has a washer which is identified as a whole with reference numeral 6. The washer 6 has a body identified with reference numeral 7 which is provided with a first upper bearing face surface 8 cooperating with the nut 3, a second lower bearing face surface 9 cooperating with the object 2 or in particular with a surface of one of the parts to be assembled with one another, and at least one turning resistant surface which is identified with reference numeral 10. The first and second bearing face surfaces are spaced from one another in an axial direction or in other words in a direction of an axis A1 of the washer which coincides with an axis A2 of the bolt. The at least one third turning resistant surface 10 is located radially inwardly of the body 7 of the washer 6. The third turning resistant surface 10 is formed so as to engage with or wedge in the thread 5 of the bolt 1, for example by providing a corresponding thread 11 on the turning resistant surface 10, and therefore to provide a turning friction of the washer 6 with the bolt 1.

As shown in FIG. 1, the body 7 is composed of two parts 7' and 7" which are located radially adjacent to one another, so that the part 7" is located radially inwardly of the part 7'. The turning resistant surface 10 with the bolt thread engaging means 11 is provided radially inwardly on the part 7". The parts 7' and 7" are connected with one another so as to avoid turning relative to one another, but to permit a movement relative to one another in an axial direction. For this purpose, the portions 7' and 7" can be frictionally connected with one another, for example by being press-fit to create a greater resistance toward movement than the turning force applied by the bolt and so as to stop the bolt from turning along with the nut and permitting an axial movement of the part 7" relative to the part 7' when the bolt is pulled up by the turning nut.

Figure 1A:
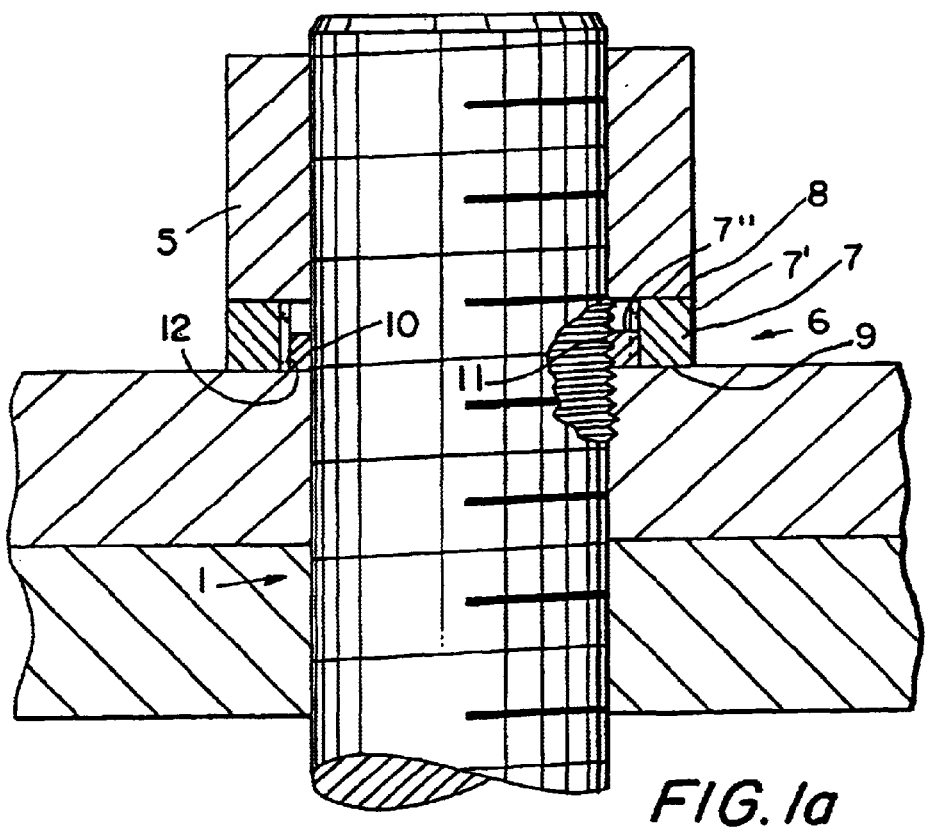
FIG. 1a is a view showing another embodiment of the fastener part of a power tool in accordance with another embodiment of the invention.

In the embodiment shown in FIG. 1a the turning of the part 7" relative to the part 7' is stopped by interengaging splines 12, for example provided on the radially outer surface of the part 7" and a radially inner surface of the part 7', which permits the axial movement of the part 7" only.

Figure 1B:
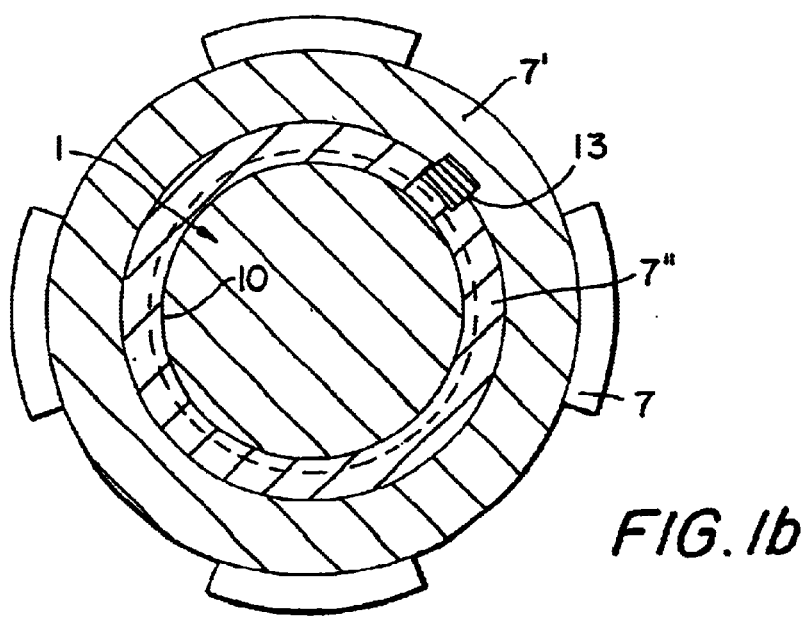
FIG. 1b is a view showing a transverse cross-section of the fastener part of a power tool in accordance with a further embodiment of the invention.

In the embodiment shown in FIG. 1b the turning of the part 7" relative to the part 7' is prevented for example by a key 13 which permits axial movement between the parts 7' and 7" only.

Figure 2:
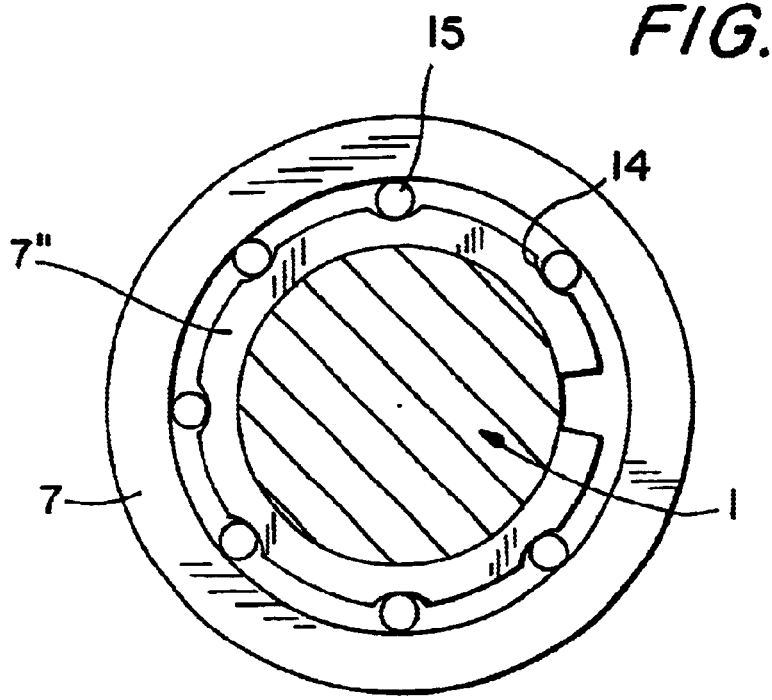
FIG. 2 is a view showing a transverse section of a fastener part in accordance with another embodiment of the inventive power tool.

As shown in FIG. 2 the part 7" can be for example formed as a split ring, and its radially outward surface can have inwardly rounded pockets 14 extending in the axial direction and radially inward surface of the part 7' can contain pins 15 which are coaxial with the bolt axis and which sit partially in the pockets. They force the split ring inwardly into the bolt thread if a turning motion is introduced into the part 7' and/or the 7", while limiting the turning between the parts 7' and 7" and also adding a further friction to the movement of the part 7' and 7" relative to one another in the axial direction.

Figure 3:
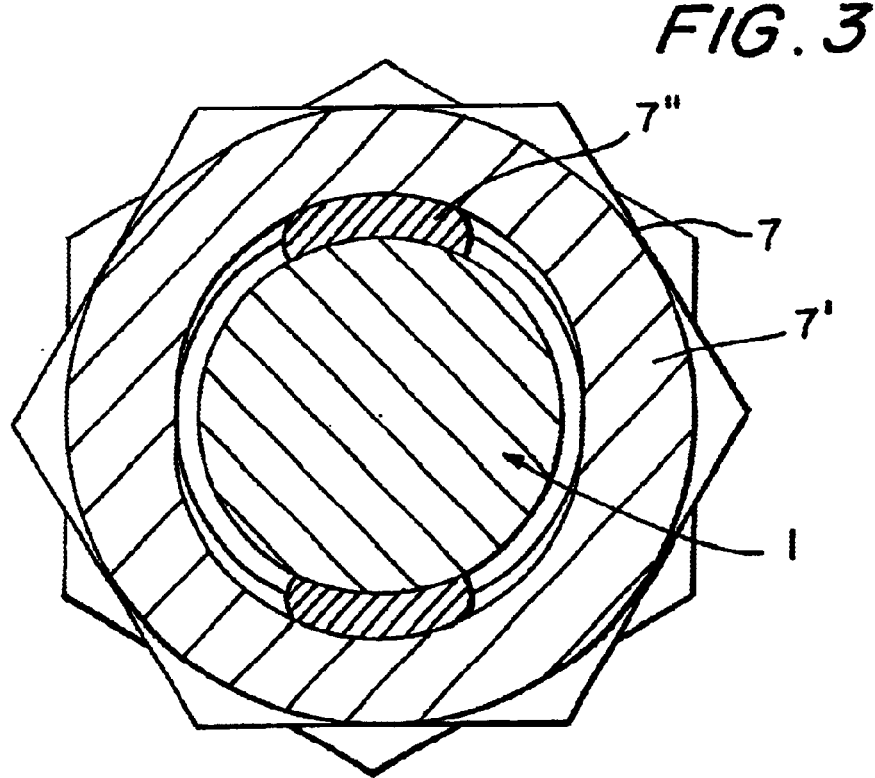
FIG. 3 is a view showing a transverse section of a fastener part of the power tool in accordance with still another embodiment of the present invention.

As shown in FIG. 3 the part 7' can have an oval inward surface whose rounded portion has a given dimension, while the part 7" can have at least one ring section engaging the bolt thread and located in the rounded portion by another dimension. Therefore the ring section is forced inwardly into the bolt thread if a turning motion is introduced to the part 7' and/or the part 7" in either direction, while adding restrictions to the movement of the part 7' and the part 7" relative to one another.

Figure 3A:
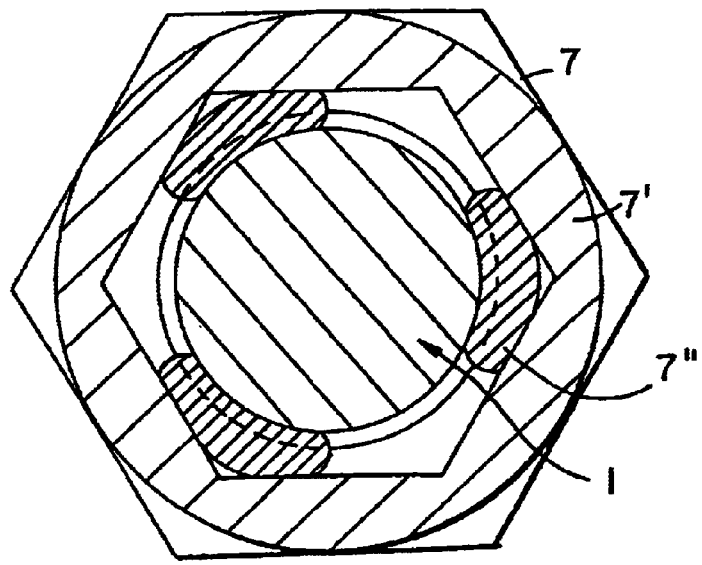
FIG. 3a is a view showing is a view showing a transverse section of the fastener part of the power tool in accordance with a further embodiment of the present invention.

In accordance with a further embodiment shown in FIG. 3a, the part 7' can be other than round or oval. It can have a shape which is different from the round or oval shapes.

Figure 4A:
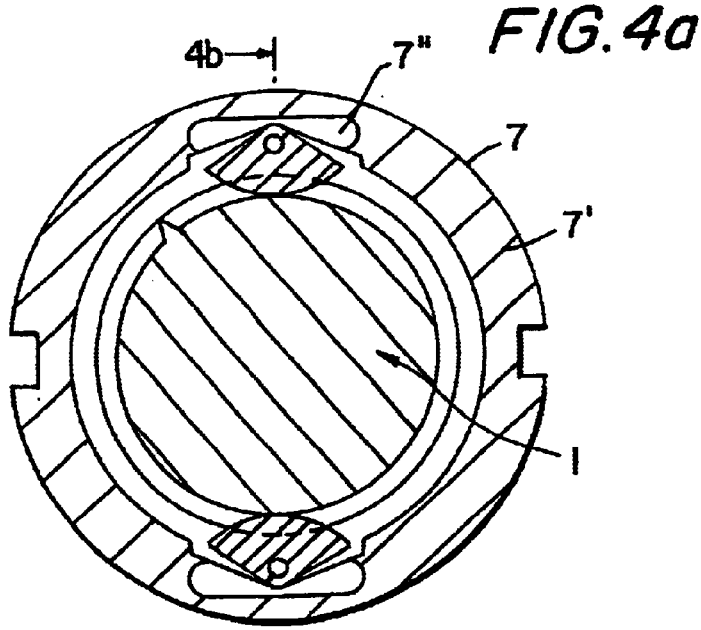
FIGS. 4a and 4b are views showing a transverse section and a longitudinal section of a fastener cart of the power tool in accordance with still a further embodiment of the present invention.
Figure 4B:
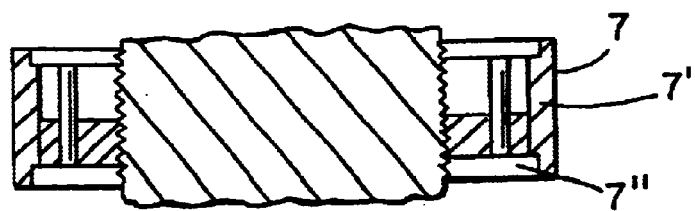

As shown in FIG. 4a, 4b, the part 7" can be at least one part which for example has one of its sides banking on the inward surface of the part 7' and formed to restrict the turning motion of the part 7". It has its outer side engaging with the bolt thread and formed with increasing radius relative to the above mentioned one side, so as to turn within its restrictions and thus engage more and more the bolt thread with its outer side, while squeezing more and more with its other side against the inward surface of the part 7' to increase its friction with the part relative to the axial movement of the part 7".

Figure 4C:
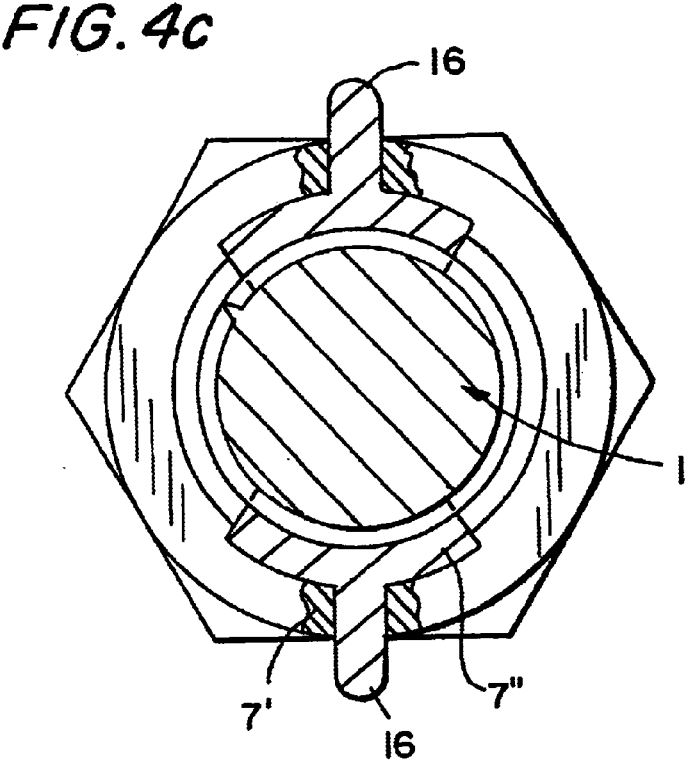
FIG. 4c is a view showing a transverse section of the fastener part of the power tool in accordance with still a further embodiment of the present invention.

In the embodiment of FIG. 4c a pin 16 sits for example on the part 7" and extends outwardly through the part 7' to extend over the outer circumference of the part 7'. Therefore when the engaging means of the tool are connected to the engaging means of the part 7' the pin 16 is pushed inwardly to push the thread engaging sections into the bolt thread, so that the washer can be placed on the bolt without requiring the turning of the washer down the extending bolt threads and so that the axial movement of the thread engaging section is subject to overcoming the friction between it and the pin 16.

Figure 5A:
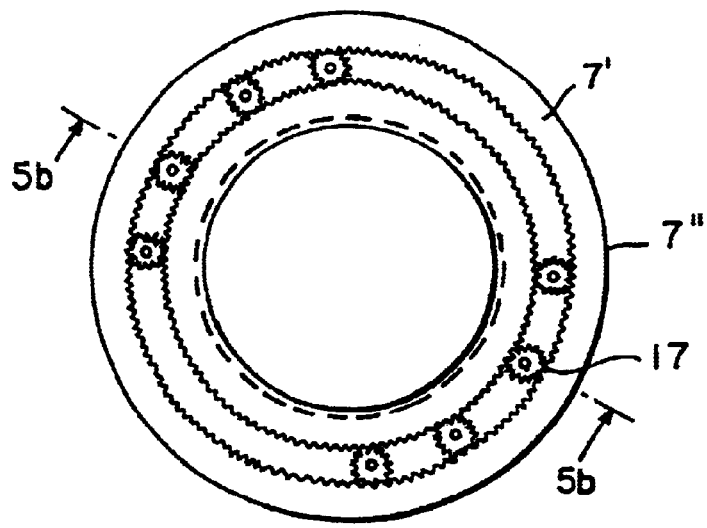
FIGS. 5a and 5b are a plan view and a longitudinal cross-section of the fastener part of the power tool in accordance with an additional embodiment of the present invention.
Figure 5B:
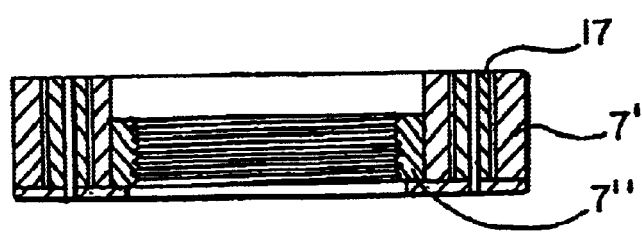

In the embodiment of FIG. 5 the washer is formed so as to stop the bolt and the washer from turning along with the nut when the nut is turned by a power tool. Therefore, a turning resistant portion 7" of the washer 7 has for example a ring having an inward side engaging in the bolt thread and an outward side having gear teeth to turn a gear engaging in the gear teeth of the ring and also engaging in the inward side of the washer body with the two facial friction areas. The gear 17 is connected to a plate 17a between the washer body and the object. When the bolt turns along with the nut, the turning resistant portion of the washer wants to turn along in the same direction tying to turn the gear which in turn tries to turn the washer body in the opposite direction to the drag friction applied to its bearing face surface by the nut, so that the bolt and the washer with its part remains rotation stationary while the nut is turned.

Figure 6A:
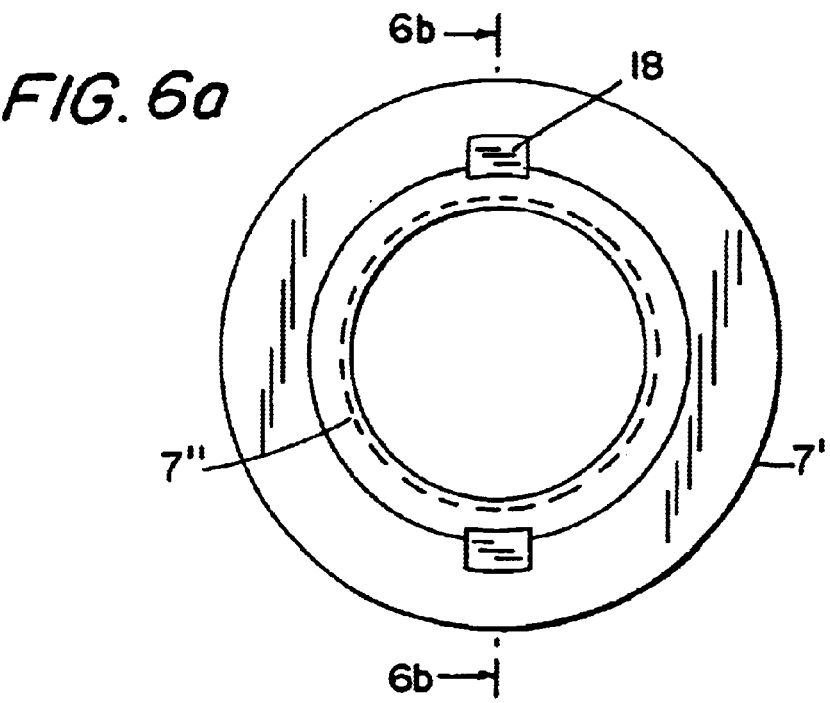
FIGS. 6a and 6b are a plan view and a longitudinal cross-section of a fastener part of the power tool in accordance with still an additional feature of the present invention.
Figure 6B:
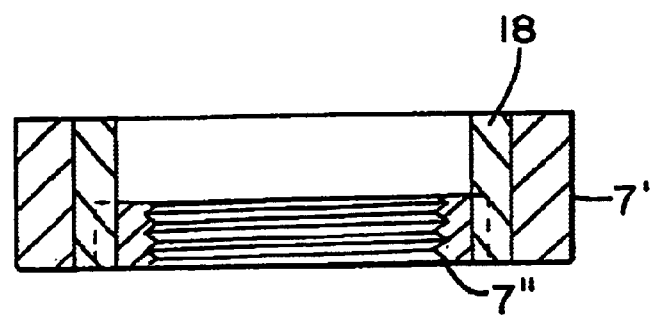

In the embodiment of FIG. 6 the washer is formed so as to stop the bolt from turning in the turning resistant portion of the part 7" by providing at least one wedge-shaped part 18 between the parts 7' and 7". It stops the part 7" from turning in the part 7' so that the drag force of the turning bolt can only rise the turning resistant portion of the washer which, however, wedges it further into the bolt thread until the bolt stops turning and the turning resistant surface moves only axially with the bolt.

When as shown in FIG. 1', the power tool part is placed on the fastener so as to tighten or loosen the nut 5, the working fluid medium in the cylinder 24 displaces the piston 25 which in turn through the pawl-ratchet mechanism turns the ratchet 28, and as a result the rotatable driving element 22 which is connected to the nut 5 turns the nut to overcome the thread friction with the bolt 1 and the facial friction with the washer 6, while the non-rotatable element 23 which is immovably connected to the housing is connected to the washer 6 to absorb the reaction force due to the facial friction of the washer 6 with the nut 5, its facial friction with one side of the parts 2, and its turning friction with the bolt 1, so that the washer 6 and the bolt 1 do not turn, but absorb the reaction force. During the operation of the inventive power tool, the action force is applied to the nut 3, and equal reaction force is applied to the washer 6.

It is to be understood that in order to engage the nut 3 by the rotatable driving element 22, the nut and the rotatable driving element must have corresponding connecting means formed, for example as cooperating polygonal surfaces of the nut and of the rotatable driving element. On the other hand, in order to connect the non-rotatable element 23 to the washer 6, the washer and the non-rotatable element also must be provided with connecting means formed for example also as cooperating polygonal surfaces of the washer and of the non-rotatable element.

The lower bearing face surface 9 of the body of the washer can be formed so as to have a high friction relative to the object. For example, it can be roughened.

It will be understood that each of the elements described above, or two or more together, may also find a useful application in other types of constructions differing from the types described above.

While the invention has been illustrated and described as embodied in washer, fastener provided with a washer, and method of fastening with the use of the washer, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is:

1. A power tool in combination with a fastener for fastening objects, comprising a tool part including a housing provided with a non-rotatable element; and a power drive in said housing and provided with a rotatable driving element; and a fastener part including a bolt having a thread and an axis and introducable into parts forming an object, a nut screwable on said bait and cooperating with said rotatable driving element, and a washer to be applied between said nut and the object and cooperating with said non-rotatable element, said washer having an axis and being provided with a first bearing face surface located at one axial side and adapted to cooperate with said nut and having a facial friction with said nut, a second bearing face surface located at an opposite axial side and adapted to cooperate with the object and having a facial friction with the object, and at least one third turning resistant surface located inside said washer and adapted to cooperate with said thread of said bolt and having a turning friction with the bolt, said washer including a radially inner part having a radially outer surface and bolt thread engaging means to connect with a thread of the bolt, and also including a radially outer part having a radially inner surface, said radially outer and inner surfaces of said radially inner and radially outer parts of said washer cooperating with one another so that said radially inner part can not rotate freely inside said radially outer part during tightening but is displaceable axially relative to said radially outer part upon bolt elongation, so that when said driving element turns said nut with a given active force in one direction and said outer part of said washer is held stationarily by a reactive force applied by said non-rotatable element of said housing to absorb a reaction force corresponding to said given force and due to the facial friction of said washer with said nut, the facial friction of said was her with the object, and the turning friction of said washer with said bolt, only said nut turns to elongate said bolt, and said washer remains rotationally stationary while said bolt does not turn but elongates or relaxes in an axial direction.

2. A power tool as defined in claim 1, wherein said tool part has a turning mechanism, said driving element being formed as a projection which is connected with said turning mechanism and is turned by the latter.

3. A power tool as defined in claim 2, wherein said at least one third turning resistant surface is said radially inner surface of said washer which is coaxial with said axis and is provided with said bolt thread engaging means.

4. A power tool as defined in claim 3, wherein said bolt thread engaging means has a thread having a different angle than said thread of said bolt so as to create a greater friction between said washer and the bolt thread.

5. A power tool as defined in claim 3, wherein said bolt thread engaging means is not threaded but has a surface softer than a thread of the bolt to cause friction.

6. A power tool as defined in claim 1; and further comprising means for pressing said bolt thread engaging means to and wedging in the bolt thread during turning of the nut and including inclined surface means provided on one of said washer parts and acted upon during turning of the nut so us to press said inner washer part radially in a radially inward direction toward the bolt.

7. A power tool as defined in claim 6; and further comprising pin means arranged between said washer parts and acting on said inclined surface means to press said inner washer part in a radially inward direction toward the bolt.

8. A power tool as defined in claim 1; and further comprising means for connecting said washer parts with one another so that they are not freely rotatable relative to one another but axially movable relative to one another, said connecting means including a plurality of splines provided on said washer parts and engaging with one another.

9. A power tool as defined in claim 1; and further comprising means for connecting said washer parts with one another so that they are not freely rotatable relative to one another but axially movable relative to one another, said connecting means including means for press fitting said washer parts with one another.

10. A power tool as defined in claim 1; and further comprising means for connecting said washer parts so that they are not freely rotatable relative to one another but axially movable relative to one another, said connecting means including key means provided between said washer parts.

11. A power tool as defined in claim 1, wherein at least one of said washer parts has a non-round surface facing the other of said washer parts so that said washer parts are not freely rotatable relative to one another but axially movable relative to one another.

12. A power tool as defined in claim 1, wherein at least one of said washer parts has a cross-section which cooperates of the other washer part so that said washer parts are not freely rotatable relative to one another but axially movable relative to one another.

13. A power tool as defined in claim 1; and further comprising means for pressing said inner washer part toward the thread of the bolt and movable between an inoperative position in which it does not press said inner washer part toward the thread of the bolt and an operative position in which it is displaced toward said inner washer part so as to press said inner washer part toward the thread of the bolt.

14. A power tool as defined in claim 1; and further comprising connecting means for connecting said washer parts with one another so that they are not freely rotatable relative to one another but axially movable relative to one another, said connecting means including ring gear means engaging with both said washer parts.

15. A power tool as defined in claim 14, wherein said ring gear means is provided with plate means adapted to be located between said washer and the object.

16. A power tool as defined in claim 1; and further comprising means for connecting said radially inner and radially outer washer parts with one another so that they are not freely rotatable relative to one another but axially movable relative to one another; said connecting means including wedge means provided between said washer parts.

17. A power tool as defined in claim 1, wherein said second bearing face surface is formed so as to have a high friction relative to the object.

18. A power tool in combination with a fastener for fastening objects, comprising a tool part including a housing provided with a non-rotatable element, and a power drive in said housing and provided with a rotatable driving element; and a fastener part including a bolt having a thread and an axis and introducable into parts forming an object, a nut screwable on said bolt and cooperating with said rotatable driving element, and a washer to be applied between said nut and the object and cooperating with said non-rotatable, washer having an axis and being provided with a first bearing face surface located at one axial side and having a facial friction with said nut, a second bearing face surface located at an opposite axial side and having a facial friction with the object, and at least one third turning resistant surface adapted to cooperate with said thread of said bolt and having a turning friction with the bolt, so that when said driving element turns said nut with a given active force in one direction and said washer is held stationarily by said non-rotatable element of said housing to absorb the reaction force due to the facial friction of said washer with said nut, the facial friction of said washer with the object, and the turning friction of said washer with said bolt, only said nut turns to tighten or loosen said bolt, and said washer remains rotationally stationary while said bolt elongates or relaxes in an axial direction, said washer including a radially inner part having a radially outer surface and bolt thread engaging means to connect with a thread of the bolt, and also including a radially outer part having a radially inner surface, and said radially outer and radially inner surfaces of said radially inner and radially outer parts of said washer cooperating with one another so that said radially inner part can not rotate freely inside said radially outer part during tightening but is displaced axially relative to said radially outer part upon bolt elongation.

* * * * *